United States Patent [19]
Dimitri et al.

[11] Patent Number: 5,956,301
[45] Date of Patent: Sep. 21, 1999

[54] AUTOMATED DATA STORAGE LIBRARY MEDIA HANDLING WITH A PLURALITY OF PICKERS HAVING MULTIPLE GRIPPERS

[75] Inventors: Kamal Emile Dimitri; John Edward Kulakowski; Rodney Jerome Means; Daniel James Winarski, all of Tucson, Ariz.

[73] Assignee: International Business Machines Corporation, Armonk, N.Y.

[21] Appl. No.: 09/047,334

[22] Filed: Mar. 25, 1998

[51] Int. Cl.⁶ .......................... G11B 17/22; B07C 17/00
[52] U.S. Cl. .......................... 369/34; 364/478.02
[58] Field of Search .......................... 369/34, 30, 36, 369/37, 38, 39, 178; 364/478.02, 478.03, 478.04, 478.05, 478.06

[56] References Cited

U.S. PATENT DOCUMENTS

| | | | |
|---|---|---|---|
| 3,831,197 | 8/1974 | Beach et al. | 360/71 |
| 4,675,856 | 6/1987 | Rudy et al. | 369/36 |
| 5,128,912 | 7/1992 | Hug et al. | 369/38 |
| 5,197,055 | 3/1993 | Hartung et al. | 369/34 |
| 5,239,650 | 8/1993 | Hartung et al. | 395/650 |
| 5,303,214 | 4/1994 | Kulakowski et al. | 60/98.04 |
| 5,377,121 | 12/1994 | Dimitri et al. | 364/478.06 |
| 5,386,516 | 1/1995 | Monahan et al. | 369/30 |
| 5,513,156 | 4/1996 | Hanaoka et al. | 369/34 |
| 5,532,931 | 7/1996 | Erickson, Jr. et al. | 364/478.06 |
| 5,546,366 | 8/1996 | Dang | 369/36 |
| 5,610,882 | 3/1997 | Dang | 369/36 |
| 5,613,154 | 3/1997 | Burke et al. | 395/821 |
| 5,680,377 | 10/1997 | Dang et al. | 369/36 |
| 5,715,216 | 2/1998 | Dang et al. | 369/34 |
| 5,781,367 | 7/1998 | Searle et al. | 360/92 |
| 5,818,723 | 10/1998 | Dimitri | 364/478.02 |
| 5,883,864 | 3/1999 | Saliba | 369/34 |

OTHER PUBLICATIONS

Error Recovery Scenarios for Dual–Gripper Pickers in Libraries, IBM Technical Disclosure Bulletin, vol. 39 No. 07 Jul. 1996, pp. 79–85.

Disposition Switching Algorithm for Two–Gripper Picker, IBM Technical Disclosure Bulletin, vol. 33 No. 10B Mar. 1991, pp. 439–440.

Concurrent Fetching of Cartridges by Two Independent Library Pickers, IBM Technical Disclosure Bulletin, vol. 37 No. 06B Jun. 1994, pp. 121–124.

*Primary Examiner*—Tan Dinh
*Attorney, Agent, or Firm*—John H. Holcombe; Robert M. Sullivan

[57] ABSTRACT

Disclosed are an automated data storage library having a plurality of pickers with multiple grippers and a method for operating the library to respond to received input commands which require an exchange of media at a point of exchange (e.g., at a storage slot or read/write station), by first determining whether the source and destination locations for the media to be exchanged are on opposite sides of the point of exchange. Next, if the source and destination locations for the media to be exchanged are on opposite sides of the point of exchange, the exchange is decomposed into separate moves, and each of the separate moves is assigned to a different one of the pickers. The assignment may additionally comprise ordering the sequence of the separate moves so that the fetch of a medium from the point of exchange precedes the delivery of another medium to the point of exchange, and the picker selected to fetch the medium from the point of exchange is the picker having an available gripper which is closest to the destination location.

20 Claims, 5 Drawing Sheets

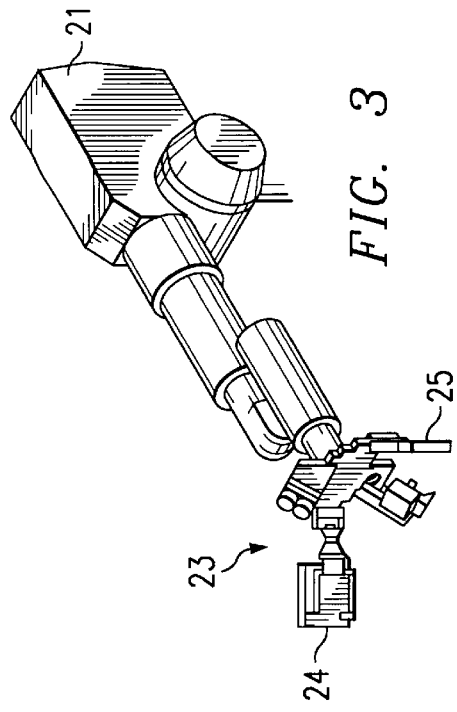
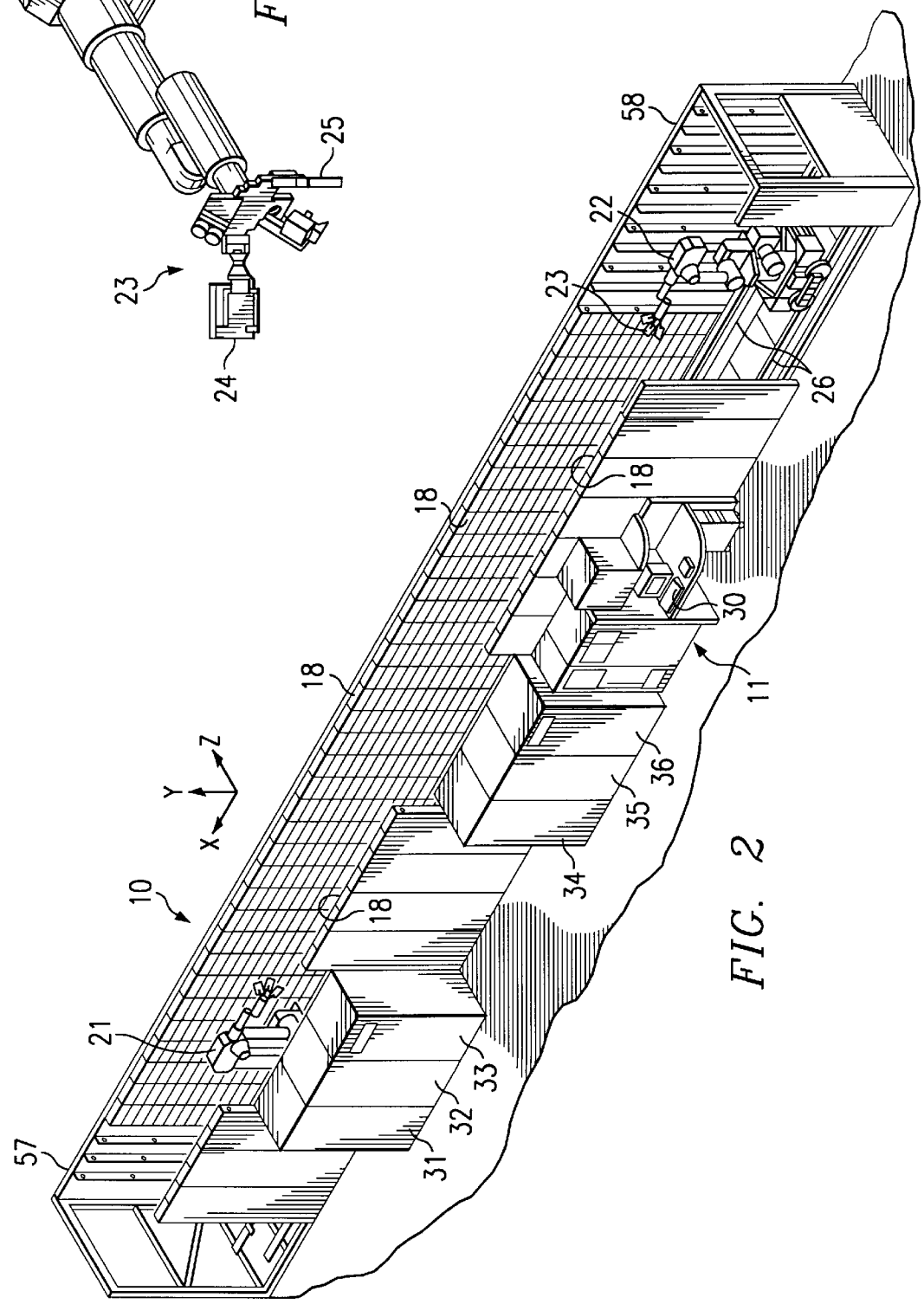

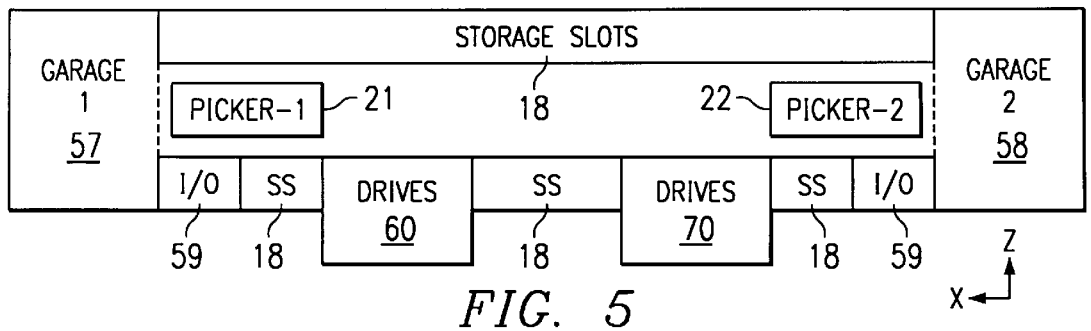
FIG. 5
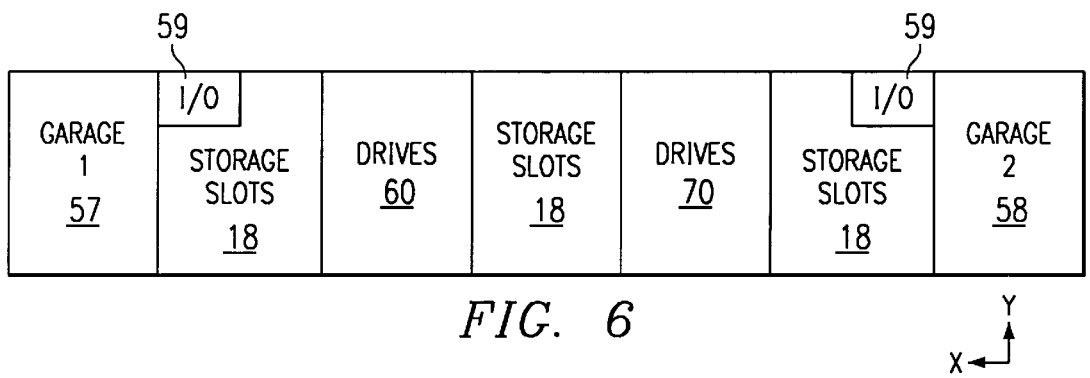
FIG. 6
FIG. 7

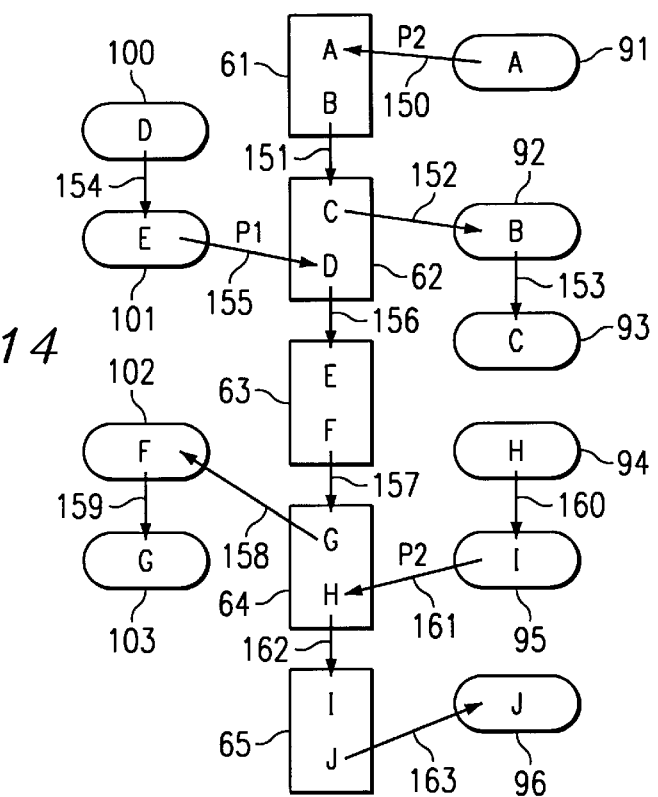
FIG. 14
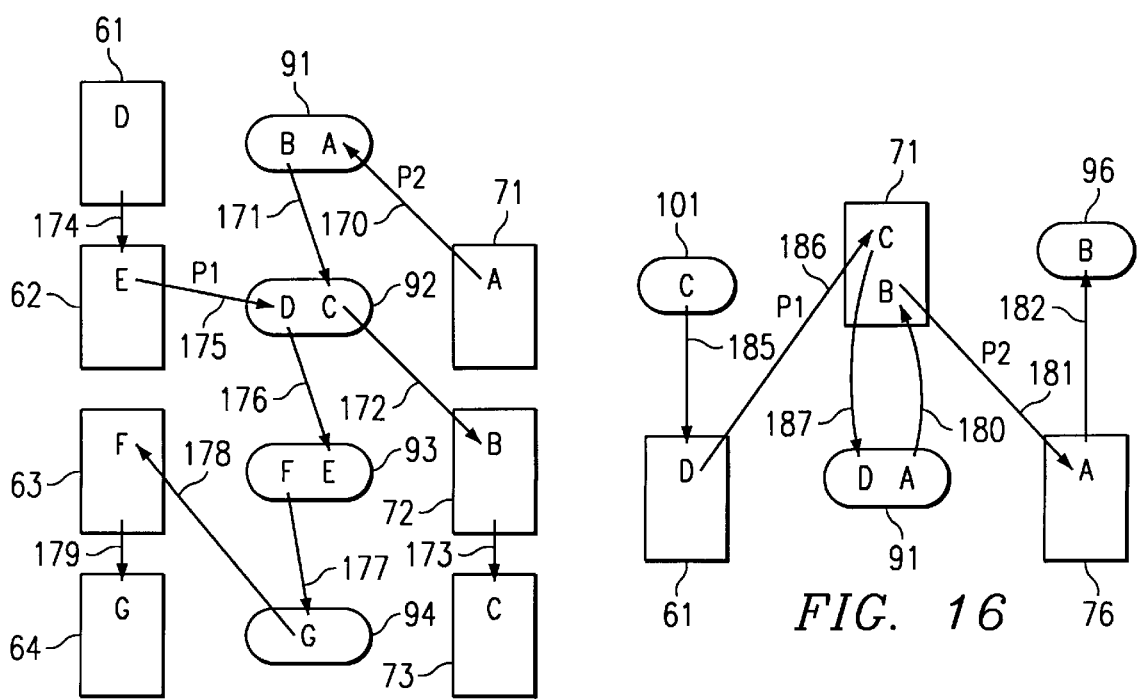
FIG. 15
FIG. 16

AUTOMATED DATA STORAGE LIBRARY MEDIA HANDLING WITH A PLURALITY OF PICKERS HAVING MULTIPLE GRIPPERS

TECHNICAL FIELD

This invention relates to automated data storage libraries for storing media in a plurality of storage slots, and, more particularly, to automated data storage libraries having a plurality of pickers for independently accessing the plurality of storage slots.

BACKGROUND OF THE INVENTION

In an automated data storage library, numerous storage slots, or cells, arrayed within the library are used to hold data storage media, such as magnetic tape cartridges or cassettes, or optical disk cartridges. (The term "media" used herein refers to any portable housing structure containing any type of data storage media.) The storage slots are typically arranged in planar or cylindrical arrays of rows and columns. A picker, furnished with one or more grippers, is a robotic device which moves along a guideway in a horizontal motion, or about a pivot in a rotary motion, and moves vertically to access the various storage slots with the gripper, and transports selected data storage media amongst the storage slots and one or more read/write stations. Libraries also typically contain input/output stations or ports through which an operator may pass data storage media to be added to the storage array and through which the picker may pass data storage media to be removed from the data storage array. The operation of the picker is typically under the direct control of a library manager, which is a data processing controller typically situated in a library or in an external host controlling the library. The library controller is interconnected with one or more host computer systems, such as a mainframe or network computer, which issues commands to the library. The read/write stations may be interconnected with the host(s) and, after a data storage medium is delivered to the station, typically search for, and read selected data from or write data to the selected data storage medium under the control of a host.

Commands received by the library manager from the host(s) are often queued to permit the receipt of additional commands during the execution of the previous command so that the processing speed of the system is increased. Two grippers may be provided on a picker to further increase the speed of the system. An example of a library having queuing and a two gripper picker is illustrated in co-assigned U.S. Pat. No. 5,646,918, Dimitri et al., issued Jul. 8, 1997. Additionally, two pickers may be provided and may be operated simultaneously to increase the speed of the system. An example of a library having queuing and two pickers is illustrated in U.S. Pat. No. 5,513,156, Hanaoka et al., issued Apr. 30, 1996.

It is desirable that an automated data storage library operate at high efficiency, minimizing the picker motion. Thus, a two gripper picker may, as described in the '918 patent, conduct an "exchange" of media at a read/write station or at a storage slot, using one of the grippers to fetch a cartridge or cassette from a read/write station (or storage slot) and the other to deliver another cartridge or cassette to the read/write station (or storage slot). The "exchange" in the '918 patent comprises a combination of individual cartridge moves directed by commands received from the host(s). The combined commands involve, for example, a move of one cartridge from a storage slot to a read/write station and a move of another cartridge from the same read/write station to a different storage slot.

While an exchange of media may lead to greater efficiency in many cases where a single picker with dual grippers is employed, a library having two or more pickers may be unable to employ the technique. For example, the dual pickers in the '156 patent may be restricted in movement, so that it may not be possible for one picker to conduct an exchange where one of the cartridges is to be moved from or to an area where the other picker is located. Copending patent application Ser. No. 09/015272, Dimitri et al., filed Jan. 29, 1998, "Automated Data Storage Library Dual Picker Interference Avoidance," allows two pickers to conduct moves, including exchanges by one of the pickers, while avoiding interference between the pickers. In many instances, it is not efficient to attempt an exchange where two or more pickers are involved, even though interference may be avoided, for example, if one picker must be moved out of the way and idled so that another picker may conduct an exchange.

SUMMARY OF THE INVENTION

It is an object of the present invention to provide efficient exchanges of data storage media in automated data storage libraries having two or more pickers.

Disclosed are an automated data storage library having two or more pickers with multiple grippers, a method, a computer program product and an article of manufacture embodying program code for operating the library to respond to received input commands which require an exchange of data storage media, by first determining whether the source and destination locations for the media to be exchanged are on opposite sides of the point of exchange thereof. Next, if the source and destination locations for the media to be exchanged are on opposite sides of the point of exchange thereof, decomposing the exchange into separate moves, and assigning each of the separate moves to a different one of the pickers.

The assignment additionally comprises ordering the sequence of the separate moves so that the fetching of a medium from the point of exchange precedes the delivery of a medium to the point of exchange.

The selection of the pickers to conduct the moves additionally comprises selecting the one of the pickers having an available gripper which is closest to the destination location to fetch the medium from the point of exchange.

An advantage of the present invention is that two independently operated pickers are involved in the exchange and can therefore save otherwise wasted movements of one picker to accommodate the exchange as conducted by another picker.

For a fuller understanding of the present invention, reference should be made to the following detailed description taken in conjunction with the accompanying drawings.

BRIEF DESCRIPTION OF THE DRAWINGS

FIG. 2 is a perspective illustration of the automated data storage library of FIG. 1;

FIG. 3 is an enlarged perspective view of a portion of a dual-gripper picker of FIG. 2;

FIGS. 5 and 6 are diagrammatic representations of the automated data storage library of FIGS. 1 and 2;

FIG. 7 is a table depicting the identification of the status of the automated data storage library of FIGS. 5 and 6; and FIGS. 8 through 16 are schematic representations of various scenarios illustrating the operation of the present invention.

DETAILED DESCRIPTION OF THE INVENTION

Figure 1:
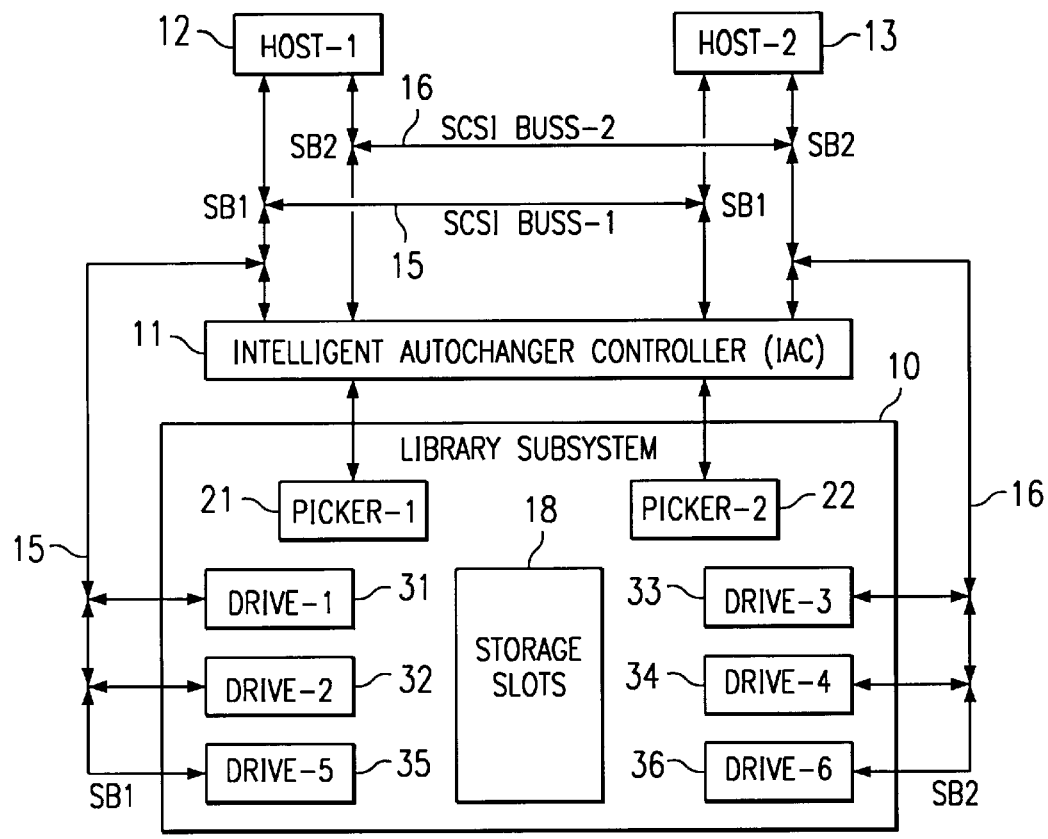
FIG. 1 is a block diagram of an automated data storage library with two dual-gripper pickers in accordance with the present invention.

Referring to FIGS. 1 and 2, an automated data storage library 10 and library controller 11 are illustrated in block diagram form. The library is shown connected to two host data processing systems 12 and 13 over busses 15 and 16. For example, the hosts may comprise AS/400 or RISC SYSTEM 6000 data processors supplied by IBM. The busses 15 and 16 may comprise any suitable bus communication path or paths between the host data processing systems 12 and 13 and the automated data storage library 10 and Into controller 11. One example comprises the small computer systems interface (SCSI) which is defined by various standards and is well known in the industry.

The library controller 11 comprises a computer processor having, or supplied with, computer readable program code which causes the controller to operate the library. An example of a suitable computer processor is a PS-2 computer processor supplied by IBM. The computer readable program code may be stored in memory or storage of the computer processor or may be supplied to the computer processor by means of an article of manufacture, such as a CD-ROM.

The library 10 stores a plurality of data storage media in storage slots 18 on both inside walls. Two pickers 21 and 22 (shown enlarged in FIG. 3) are each provided with a dual-gripper assembly 23 having first and second grippers 24 and 25. (Although the description herein is directed toward a dual-gripper picker, the invention is not limited thereby, but is applicable to pickers with more than two grippers). The pickers 21 and 22 ride along a common guideway 26, which may comprise one or more tracks, to remove and replace data storage media from and to the storage slots 18.

The pickers 21 and 22 operate under the control of controller 11, which may have an operator terminal 30, to fetch the data storage media from storage slots 18 and supply them to any of read/write stations, or data storage drives 31–36. The controller 11 may be situated at the library or may be in an external host processor. In the illustrated embodiment, host processor 12 is directly connected to drives 31, 32 and 35, and host processor 13 is directly connected to drives 33, 34 and 36. This allows maximum data transfer rates between drives and associated hosts. The SCSI busses 15 and 16 also allow alternate pathing from the hosts to the other drives. The host processors issue commands to the drives to search for, and to read and/or write data on the data storage media, and supply or receive the data with respect to the associated drive.

The controller operates the pickers to move in the "X" direction along the common guideway 26, and to raise or lower the gripper assembly 23 in the "Y" direction, so that a gripper 24 or 25 may move in the "Z" direction to fetch or to deliver a data storage medium to a data storage drive or storage slot.

Figure 4A:
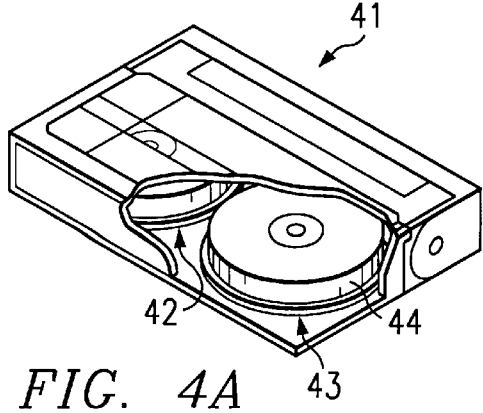
FIGS. 4A and 4B are illustrations of one type of data storage media which may be stored in the automated data storage library of FIGS. 1 and 2.
Figure 4B:
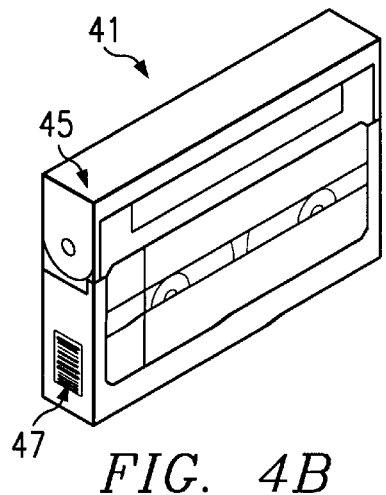

An example of one type of media, a typical tape cassette 41, is illustrated in FIGS. 4A and 4B. The typical cassette has two reels 42 and 43 on which is wound a tape 44. A cover 45 protects the tape while the cassette is being stored and transported, and the read/write data storage (tape) drive 31–36 of FIG. 1 opens the cover 45 during loading to gain access to the tape for reading and/or writing thereon.

A bar code 47 may be provided on an edge of the cassette for identification of the cassette by a bar code reader (not shown) mounted on the pickers 21 and 22 of FIG. 1.

Referring to FIGS. 1, 4A and 4B, when the tape cassette 41 is fetched and transported to a read/write tape drive 31–36, the tape 44 is positioned at the "beginning of tape", or BOT. The host will typically command the operation of the tape drive to search for particular data to read or a particular location on the tape at which to write, and read or write data at that location. BOT is the location on the tape where the "volume serial number" (VOLSER) for the cassette is recorded, along with other control information for this volume. This data is used to verify the correct tape is being accessed, and to determine the block size and blocking factor used for this volume. BOT may be located at one end of the tape so that the tape is wound primarily on one of the reels of the cassette for storage. Alternatively, the BOT may be located at a midpoint of the tape so that the seek distance to a desired location is likely to be shorter.

The typical read/write tape drive 31–36 will reel the tape 44 while searching for the desired data to read or the desired location at which to begin writing. Upon locating the desired data or location, the tape drive will conduct the read and/or write operation. Upon completion of reading and/or writing, the tape 44 will most likely be displaced a considerable distance from the BOT, and the tape must be rewound from it's position at the completion of reading and/or writing to the BOT. A rewind command from a library manager would normally operate the read/write tape drive control to rewind the tape to BOT.

The tape cassette 41 may then be returned to the original storage slot, or, more likely, will be exchanged for the next media fetched by the picker 21 or 22.

Two basic commands of the controller 11 are "move" and "exchange". As defined in the '918 patent, a "move" command is the movement of one data storage medium from one (source) location and the delivery of that data storage medium to another (destination) location; and an "exchange" command is the removal of one data storage medium from one location, delivery of the data storage medium to second location already having a data storage medium, exchanging the one medium for the other, and delivery of the removed data storage medium to a third location.

In accordance with the '918 patent (which has only one picker), to conduct an exchange, both grippers of the picker must initially be empty. One of the grippers then grips a first cartridge, while the second gripper is empty. The picker travels to the location of the exchange, which is the location of a second cartridge. The picker fetches the second cartridge with the second gripper, inserts the first cartridge into the location with the first gripper, then transports the second cartridge to a new location.

As described above, while an exchange of media may lead to greater efficiency in many cases where a single picker with dual grippers is employed, a library having two or more pickers may restrict the area of the movement of the pickers to avoid interference, so that it may not be possible for one picker to conduct an exchange where one of the cartridges is to be moved from or to an area where the other picker is located. In many instances, it is not efficient to attempt an exchange where two or more pickers are involved, even though interference may be avoided, for example, if one picker must be moved out of the way, for example, to a garage area, so that another picker may conduct an exchange.

An example of an automated data storage library is the IBM 3494 Data Storage Library, which stores magnetic tape cartridges, the IBM 3575 Data Storage Library, which stores magnetic tape cassettes 41, the IBM 3995 Data Storage Library, which stores optical disk cartridges, or the IBM 3850 Mass Storage Subsystem, with dual pickers.

FIGS. 5 and 6 illustrate, respectively, top and front views of one embodiment of a library in accordance with the present invention. The library incorporates the elements of library 10 of FIG. 2, as will be explained. The storage slots 18 are arranged in rows and columns. In the illustrated arrangement, the storage slots are arranged in planar fashion on either side of the pickers 21 and 22. As an alternative, the storage slots may be arranged in a cylindrical fashion on either side of the pickers, and the pickers may rotate about a common pivot point at the center of the cylinders.

There are separate garages 57 and 58 on each side of the library, one for each picker. Input/output stations 59 may be provided for allowing insertion of data storage media from outside the library. Additionally, special slots (not shown) may be provided, preferably in the garage areas for storage of special purpose media, such as cleaning cartridges. The garage can be used as storage for a picker (e.g., as it is repaired or updated).

Groupings of read/write stations (data storage drives) 60 and 70 are not located within garage regions, but with the storage slots since the other picker cannot reach into the garage region. The drives of FIG. 1, for example, are preferably intermingled among the groupings of drives, so that some of the primary drives for each host are on each side of the library.

The library controller 11 includes a table illustrated in FIG. 7 which correlates each of the data storage media in the library with its storage slot location 80, the X-Y location in the library of each drive 81, the X-Y location of the current position of each picker 82, and each of the data storage media in the input/output slots with its slot location 83. This table is updated each time a data storage media is fetched and each time a data storage media is stored, and each time a picker is moved. Thus, the library controller is able to identify the storage slot of the data storage media from the received command, determine the location of any media in a drive, and the current position of the pickers. This information is used in conjunction with job queue contents to schedule picker moves.

The library controller 11 arranges each of the commands in a queue and recognizes where the pickers are located, where the source and destination for the data storage media identified in the commands are located, and manages the queue to select appropriate jobs from the queue in the most efficient order, or delaying certain jobs to allow execution of other jobs in the most efficient way.

In accordance with the present invention, sets of jobs which result in the requirement for exchanges of media at a location, called the "point of exchange" location, are examined by the controller 11 to determine whether the source location for the medium to be delivered to the point of exchange, and the destination location for the medium to be fetched and removed from the point of exchange, are on opposite sides of the point of exchange thereof.

If the source and destination locations for the media to be exchanged are on the same side of the point of exchange, an exchange is conducted utilizing a single picker, as described in the '918 patent.

If the source and destination locations for the media to be exchanged are on opposite sides of the point of exchange thereof, the controller 11, in accordance with the present invention, decomposes the exchange into separate moves, and assigns each of the separate moves to a different one of the pickers (if the pickers have available grippers and are not already occupied with another job).

The assignment of moves additionally comprises ordering the sequence of the separate moves so that the fetching of a medium from the point of exchange precedes the delivery of a medium to the point of exchange.

The selection of pickers to conduct the separate moves additionally comprises selecting the one of the pickers having an available gripper which is closest to the destination location to fetch the medium from the point of exchange.

An advantage of the present invention is that two independently operated pickers are involved in the exchange and can therefore save otherwise wasted movements of one picker to accommodate the exchange as conducted by another picker.

An "exchange" (or swap) of media, as described above with respect to the '918 patent, is defined as the removal and transport away of one data storage medium from a specific location (point of exchange) to a destination, and insertion of another data storage medium from a source location to the same specific location (point of exchange) all in a continuous sequence of moves. In accordance with the present invention, an exchange may additionally comprise a series of overlapping moves.

For example, in accordance with the present invention, upon the source location and the destination location being determined to be on opposite sides of the location of the point of exchange, and if two pickers have at least one available gripper, then the exchange is decomposed into separate moves. In one move, the first picker moves to the point of exchange (drive or storage slot), fetches the first data storage medium from the point of exchange and transports the first data storage medium to the destination (storage slot or drive), and delivers the first data storage medium. Simultaneously, in the second move the second picker is moved to the source location (storage slot or drive) and fetches the second data storage medium. The second picker then transports the second data storage medium to the point of exchange and delivers the second data storage medium, thus effecting an efficient exchange of media at the point of exchange.

Figure 8:
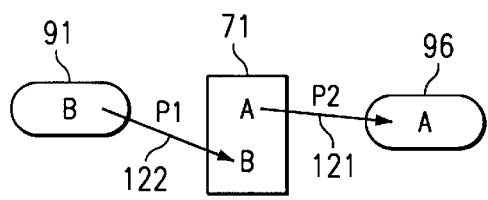
Figure 9:
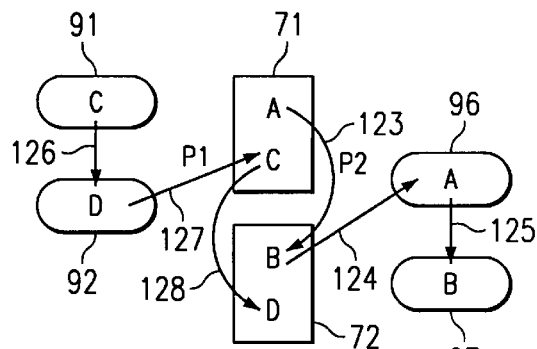
Figure 10:
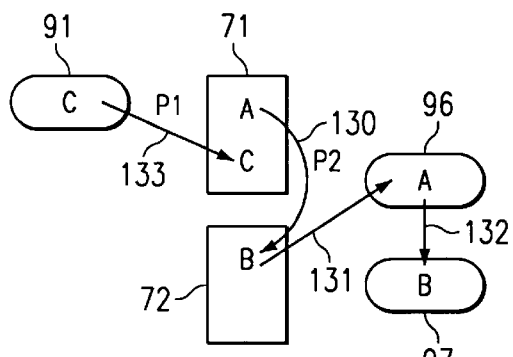
Figure 11:
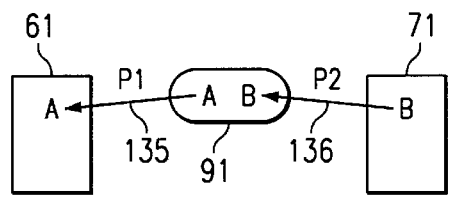
Figure 12:
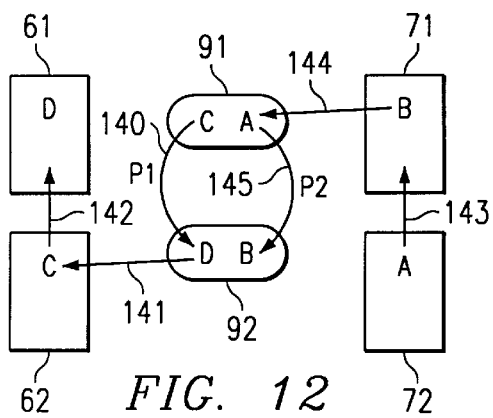
Figure 13:
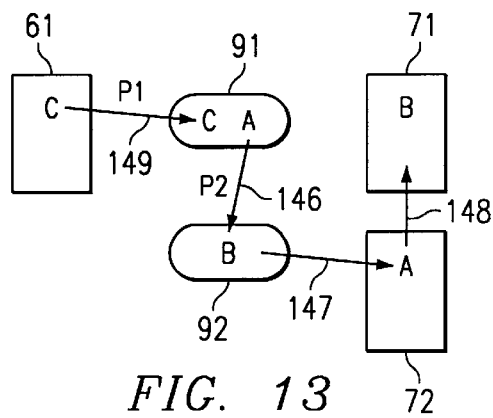

FIGS. 8 through 16 illustrate exemplary scenarios for jobs which include at least one exchange of media and wherein at least one exchange of media is of the type having the source and destination locations on opposite sides of the point of exchange thereof. The scenarios relate to the arrangement of the library as represented in FIGS. 5 and 6. The point of exchange may be a data storage drive (in group 60 or in group 70), may be a storage slot 18, or may be a storage slot in an input/output station 59. FIG. 8 represents a best response time scenario; FIGS. 9 and 10 represent best throughput scenarios; FIG. 11 represents a best response time scenario; FIG. 12 represents a best throughput scenario; FIG. 13 represents a best throughput and best response time scenario; and FIGS. 14–16 represent best throughput scenarios. Of course, the arrangement of FIGS. 5 and 6 is exemplary only, and libraries implementing the present invention may be of any arrangement employing two pickers.

Referring to FIGS. 8–16, data storage media (cartridges) are referenced by letters, e.g., "A", "B", etc.; each read/write station (drive) comprises a rectangle, e.g., drive 71; and each storage slot comprises an oval, e.g., storage slot 91. The designation of two cartridges in a drive or storage slot, e.g., cartridges A and B in drive 71 in FIG. 8, represents an exchange of cartridges, and the drive or storage slot having the designation of two cartridges, e.g., drive 71 in FIG. 8 is a point of exchange.

The two pickers are respectively designated "P1" and "P2", and may comprises pickers 21 and 22 in FIG. 5. Drives 71–76 may be in group 70, and drives 61–65 may be in group 60 in FIG. 5. Storage slots 96–97 are to the right of drives in group 70, storage slots 100–103 are to the left of drives in group 60, and storage slots 91–94 are between drives in group 60 and the drives in group 70. The arrows represent the direction of movement of the pickers.

Referring now to FIG. 8, the assumptions are that there is one exchange command (at drive 71) in the queue, and that the target cartridge B source slot 91 in the exchange is on the opposite side of drive 71 from the destination slot 96 for cartridge A in the exchange. If, instead, storage slots 91 and 96 were on the same side of drive 71, only one picker would be used to conduct the exchange. Another assumption is that each picker initially has at least one free gripper.

The controller first utilizes the table of FIG. 7 to determine the X-Y locations of the source slot 91, of the destination slot 96, and of the drive 71 to determine whether the source location 91 for the medium B to be delivered to the point of exchange 71, and the destination location 96 for the medium A to be fetched and removed from the point of exchange, are on opposite sides of the point of exchange. Next (this can also be first), the controller determines whether each of the pickers has an available gripper. If both determinations are affirmative, the controller decomposes the exchange into two separate moves 121 and 122. Since cartridge A must be removed from drive 71 before cartridge B is inserted into the drive, the controller preferably orders the sequence of the separate moves so that the move involving the fetch of cartridge A from the point of exchange 71 precedes the move involving the delivery of cartridge B to the point of exchange.

The separate moves are then assigned by the controller to different ones of the pickers. Since picker P2 is on the common guideway to the side of picker P1 in the same direction as is slot 96 (with respect to drive 71), the controller selects picker P2 for move 121, and selects picker P1 for move 122.

The controller then operates picker P2 to fetch cartridge A from drive 71 and operates picker P1 to fetch cartridge B from source slot 91. Picker P2 moves cartridge A to destination slot 96 and its gripper delivers the cartridge to slot 96. Picker P1 moves cartridge B from source slot 91 to drive 71, inserting cartridge B in the drive. Thus, cartridge B has been inserted into the drive and thereby exchanged for cartridge A.

Since both pickers P1 and P2 have been operating simultaneously and in accordance with the present invention, the response time is quicker than if a single picker had made both moves. Additionally, since the moves occupy both sides of the library from the drive 71, if only one picker had been used, the other picker would have had to have been moved out of the way, which may have been an inefficient use of the pickers.

The scenario of FIG. 9 illustrates two exchanges, and requires the use of both grippers on each picker. The assumptions are that there are two exchange commands (at drives 71 and 72) in the queue, that the target cartridge C source slot 91 in the exchange is on the opposite side of drive 71 from the destination slot 96 for cartridge A in the exchange, and that the target cartridge D source slot 92 in the exchange is on the opposite side of drive 72 from the destination slot 97 for cartridge B in the exchange. Another assumption is that each picker initially has two free grippers.

The controller first utilizes the table of FIG. 7 to determine the X-Y locations of the source slots 91 and 92, of the destination slots 96 and 97, and of the drives 71 and 72 to determine (A) whether the source location 91 for the medium C to be delivered to the point of exchange 71, and the destination location 96 for the medium A to be fetched from the point of exchange, are on opposite sides of the point of exchange, and (B) whether the source location 92 for the medium D to be delivered to the point of exchange 72, and the destination location 97 for the medium B to be fetched from the point of exchange, are on opposite sides of the point of exchange. The controller also determines whether each of the pickers initially has two available grippers.

If the determinations are affirmative, the controller decomposes each exchange into two separate moves to be assigned to separate pickers, then combining each set of separate moves for each picker into one set of moves 123, 124 and 125 for one picker, and into another set of moves 126, 127 and 128 for the other picker.

The separate moves are then assigned by the controller to different ones of the pickers. Since picker P2 is on the common guideway to the side of picker P1 in the same direction as are slots 96 and 97 (with respect to drives 71 and 72), the controller selects picker P2 for moves 123–125, and selects picker P1 for moves 126–128.

The controller then operates picker P2 to fetch cartridge A from drive 71 in one gripper and operates picker P1 to fetch cartridge C from source slot 91 with one gripper. Picker P2 moves to drive 72 to fetch cartridge B from drive 72 with the other gripper and then moves cartridge A to destination slot 96 to deliver the cartridge, and moves to destination slot 97 and its other gripper delivers cartridge B to slot 97. Picker P1 moves to slot 92 to fetch cartridge D from source slot 92 in its other gripper, and moves to drive 71, inserting cartridge C in the drive. Thus, cartridge C has been inserted into drive 71 and thereby completes the exchange for cartridge A. Picker P1 also moves to drive 72, inserting cartridge D in the drive. Thus, cartridge D has been inserted into drive 72 and thereby completes the exchange for cartridge B.

Since both pickers P1 and P2 have been operating simultaneously and in accordance with the present invention, the response time is quicker than if a single picker had made all of the moves, and far quicker than if each exchange had been conducted by a different picker. Specifically, since the moves occupy both sides of the library from the drives 71 and 72, if only one picker had been used for one exchange, and only the other picker had been used for the other exchange, the picker not used in the first exchange would have had to have been moved out of the way until the exchange was completed, and then the picker not used in the second exchange would have had to have been moved out of the way, which may have been an inefficient use of the pickers. This scenario provides the best throughput. It is not the best response time since two cartridges are fetched before a delivery is made to a drive.

Alternately, picker P1 could pick up cartridge D first and cartridge C second and picker P2 could deliver cartridge B first and A second, depending on the physical source locations of cartridges and D, or the physical destination locations of cartridges A and B. For example, if cartridge D was further from the drive than cartridge C, it would be more efficient to fetch cartridge D first. Similarly, if the physical destination location of cartridge B was closer to the drive than that of cartridge A, it would be more efficient to deliver cartridge B first. Thus, the controller may order the commands in the queue to select the moves in the most efficient order.

FIG. 10 illustrates a combination of an exchange and a move to a slot. The exchange comprises the insertion of cartridge C in drive 71, replacing cartridge A which is moved to slot 96. Thus, with the controller determining that destination slot 96 is on the opposite side of drive 71 (the point of exchange) from source slot 91, and with picker P1 having at least one gripper available and picker P2 having two grippers available, the controller selects picker P2 to fetch cartridge A from drive 71, moving on path 130 to drive 72 and fetch cartridge B. Then picker P2 moves on path 131 to deliver cartridge A to slot 96 and on path 132 to deliver cartridge B to slot 97. In another move, the controller selects picker P1 to fetch cartridge C and move on path 133 to deliver the cartridge to drive 71, exchanging the cartridge for cartridge A.

FIG. 11 illustrates a similar scenario to that of FIG. 8, but with the point of exchange being a storage slot 91 rather than a drive. The controller first utilizes the table of FIG. 7 to determine the X-Y locations of the source drive 71, of the destination drive 61, and of the slot 91, the point of exchange, to determine that the source location 71 for the medium B to be delivered to the point of exchange 91, and the destination location 61 for the medium A to be fetched from the point of exchange, are on opposite sides of the point of exchange. Assuming the controller determines that each of the pickers initially has an available gripper, the controller decomposes the exchange into two separate moves 135 and 136. Since cartridge A must be removed from slot 91 before cartridge B is inserted into the drive, the controller orders the sequence of the separate moves so that the move involving the fetching of cartridge A from the point of exchange 91 precedes the move involving the delivery of cartridge B to the point of exchange.

The separate moves are then assigned by the controller to different ones of the pickers. Since picker P2 is on the side of picker P1 in the same direction as is drive 71 (with respect to slot 91), the controller selects picker P2 for move 136, and selects picker P1 for move 135.

The controller then operates picker P1 to fetch cartridge A from slot 91 and operates picker P2 to fetch cartridge B from source drive 71. Picker P1 moves cartridge A to destination drive 61 and picker P2 moves cartridge B from source drive 71 to slot 91. Thus, cartridge B has been inserted into the drive and thereby exchanged for cartridge A.

The scenario of FIG. 12 is similar to that of FIG. 9, but with the exchanges at slots 91 and 92, instead of at drives. The controller determines that (for the two exchange commands at slots 91 and 92) the target cartridge A source drive 72 in the first exchange is on the opposite side of slot 91 from the destination drive 62 for cartridge C in the first exchange, and that the target cartridge B source drive 71 in the second exchange is on the opposite side of slot 92 from the destination drive 61 for cartridge D in the second exchange. The controller also determines that each picker initially has two free grippers.

Then, the controller decomposes each exchange into two separate moves to be assigned to separate pickers, then combining each set of separate moves for each picker into one set of moves 140, 141 and 142 for one picker, and into another set of moves 143, 144 and 145 for the other picker.

The separate moves are then assigned by the controller to different ones of the pickers. Since picker P1 is on the common guideway to the side of picker P2 in the same direction as are drives 61 and 62 (with respect to slots 91 and 92), the controller selects picker P1 for moves 140–142, and selects picker P2 for moves 143–145.

The controller then operates picker P1 to fetch cartridge C from slot 91 in one gripper and operates picker P2 to fetch cartridge A from source drive 72 with one gripper. Picker P1 moves to slot 92 to fetch cartridge D from slot 92 with the other gripper and then moves cartridge C to destination drive 62 and delivers the cartridge, and moves to destination drive 61 and its other gripper delivers cartridge D to drive 61. Picker P2 moves from drive 72 to drive 71 to fetch cartridge B from source drive 71 in its other gripper, and moves to slot 91, inserting cartridge A in the slot. Thus, cartridge A has been inserted into slot 91 and thereby exchanged for cartridge C. Picker P2 also moves to slot 92, inserting cartridge B in the slot. Thus, cartridge B has been inserted into slot 92 and thereby exchanged for cartridge D.

The scenario of FIG. 13 is similar to that of FIG. 10 and illustrates a combination of an exchange and a move. The exchange comprises the insertion of cartridge C in slot 91, replacing cartridge A which is moved to drive 72. Thus, with the controller determining that destination drive 72 is on the opposite side of slot 91 (the point of exchange) from source drive 61, and with picker P2 having two grippers available and picker P1 having one gripper available, the controller selects picker P2 to fetch cartridge A from slot 91 with one gripper, moving on path 146 to slot 92 and fetch cartridge B with its other gripper. Then picker P2 moves on path 147 to deliver cartridge A to drive 72 and on path 148 to deliver cartridge B to drive 71. In another move, the controller selects picker P1 to fetch cartridge C and move on path 149 to deliver the cartridge to slot 91, exchanging the cartridge for cartridge A.

FIG. 14 is intended to illustrate 5 exchanges, in conjunction with the teaching of the '918 patent. For the purpose of illustration, all of the exchanges are at drives 61–65. Briefly, the source and destination slots for cartridges A and B are on the same side of the drive 61, so that the exchange with drive 61 at the point of exchange employs the technique of the '918 patent; the source and destination slots for cartridges C, and the source and destination slots for cartridge D are on opposite sides of the point of exchange (drive 62), so that the exchange is conducted in accordance with the present invention. Similarly, the exchange of cartridge E for cartridge F involves source and destination slots on the same side of drive 63, and the exchange of cartridge I for cartridge J involves source and destination slots on the same side of drive 65, respectively, employing the technique of the '918 patent; and the exchanges of cartridges G and H involve a destination and a source on opposite sides of point of exchange drive 64, so that the exchange is conducted in accordance in accordance with the present invention.

Thus, the controller selects picker P2 to fetch cartridge A from slot 91, move on path 150 to drive 61 and exchange cartridge A for cartridge B, move on path 151 to drive 62 and fetch cartridge C, thereby having both grippers occupied, as a step in a separate exchange in accordance with the present invention. Another move is on path 152 to deliver cartridge B to slot 92 and cartridge C to slot 93. The controller selects picker P1 to fetch cartridge D from slot 100 in one gripper, move on path 154 to slot 101 to fetch cartridge E in the other gripper, and move on path 155 to deliver cartridge D to drive 62, completing the exchange at point of exchange 62 in accordance with the invention. Picker P1 next moves on path 156 and exchanges cartridge E for cartridge F in drive 63.

With cartridge F in one gripper, and the other gripper empty, picker P1 moves on path 157 and fetches cartridge G to begin the exchange at drive 64. Picker P1 then moves on path 158 to deliver cartridge F to slot 102 and on path 159 to deliver cartridge G to slot 103.

Next, the controller selects picker P2, whose grippers are now both empty, to first fetch cartridge H from slot 94 in one gripper, move on path 160 to fetch cartridge I from slot 95, and move on path 161 to deliver cartridge H to drive 64, completing the exchange at drive 64 in accordance with the present invention.

Picker P2 then moves on path 162 to drive 65 and exchanges cartridge I for cartridge J at drive 65, and moves on path 163 to slot 96 and delivers cartridge J.

FIG. 15 illustrates three exchanges with slots in the middle, only one of which (at slot 92) is an exchange in accordance with the present invention.

Thus, the controller selects picker P2 to fetch cartridge A from drive 71 and move on path 170 to slot 91, exchanging cartridge A for cartridge B. Picker P2 then moves on path 171 to fetch cartridge C, as the first step in the exchange at slot 92 in accordance with the invention. The picker then moves on path 172 to deliver cartridge B to drive 72, and on path 173 to deliver cartridge C to drive 73.

The controller selects picker P1 to fetch cartridge D at drive 61 and move on path 174 to fetch cartridge E at drive 62, moving on path 175 to deliver cartridge D to slot 92, thereby completing the exchange at slot 92 in accordance with the present invention.

Picker P1 then moves on path 176 to exchange cartridge E for cartridge F at slot 93, moving on path 177 to fetch cartridge G from slot 94, then on path 178 to deliver cartridge F to drive 63 and on path 179 to deliver cartridge G to drive 64.

FIG. 16 illustrates exchanges in accordance with the present invention at both a drive 71 and a slot 91.

The assumptions are that there are two exchange commands (to be conducted at drive 71 and slot 91) in the queue, that the target cartridge C source slot 101 in the exchange is on the opposite side of drive 71 from the destination slot 96 for cartridge B in the exchange, and that the target cartridge D source drive 61 in the second exchange is on the opposite side of slot 91 from the destination drive 76 for cartridge A. Another assumption is that each picker initially has two free grippers.

The controller first utilizes the table of FIG. 7 to determine the X-Y locations of the source slot 101 and drive 61, of the destination slot 96 and drive 76, and of the drive 71 and slot 91 to determine (A) whether the source location 101 for the medium C to be delivered to the point of exchange 71, and the destination location 96 for the medium B to be fetched from the point of exchange, are on opposite sides of the point of exchange, and (B) whether the source location 61 for the medium D to be delivered to the point of exchange 91, and the destination location 76 for the medium A to be fetched from the point of exchange, are on opposite sides of the point of exchange. The controller also determines whether each of the pickers has two available grippers.

If the determinations are affirmative, the controller decomposes each exchange into two separate moves to be assigned to separate pickers, then combines each set of separate moves for each picker into one set of moves 180, 181 and 182 for one picker, and into another set of moves 185, 186 and 187 for the other picker.

The separate moves are then assigned by the controller to different ones of the pickers. Since picker P2 is on the common guideway to the side of picker P1 in the same direction as are slot 96 and drive 76 (with respect to drive 71 and slot 91), the controller selects picker P2 for moves 180–182, and selects picker P1 for moves 185–187.

The controller then operates picker P2 to fetch cartridge A from slot 91 in one gripper, and move on path 180 to fetch cartridge B from drive 71 with the other gripper. Picker P2 moves on path 181 to drive 76 to deliver cartridge A to drive 76 and move cartridge B to destination slot 96 to deliver the cartridge. The fetching of cartridges A and B each comprises the first step in an exchange in accordance with the present invention. Picker P1 first fetches cartridge C from slot 101 and moves on path 185 to drive 61 to fetch cartridge D from source drive 61 in its other gripper. Then picker P1 moves to drive 71 along path 186, inserting cartridge C in drive 71. Thus, cartridge C has been inserted into drive 71 and thereby exchanged for cartridge B. Picker P1 also moves on path 187 to slot 91, delivering cartridge D. Thus, cartridge D has been inserted into slot 91 and thereby exchanged for cartridge B.

Since both pickers P1 and P2 have been operating simultaneously and in accordance with the present invention, and, since the moves occupy both sides of the library from the drive 71 and slot 91, the exchanges are conducted much quicker than if only one picker had been used for one exchange, and only the other picker had been used for the other exchange. In that case, the picker not used in the first exchange would have had to have been moved out of the way, and then the picker not used in the second exchange would have had to have been moved out of the way, which may have been an inefficient use of the pickers as compared to the operation of the pickers in accordance with the present invention.

While the preferred embodiments of the present invention have been illustrated in detail; it should be apparent that modifications and adaptations to those embodiments may occur to one skilled in the art without departing from the scope of the present invention as set forth in the following claims.

We claim:

1. A method for operating an automated data storage library, said library having a plurality of media storage slots for storing data storage media, a plurality of read/write stations, at least one of said read/write stations positioned between at least ones of said plurality of media storage slots, at least two pickers arranged on a common guideway alongside said media storage slots and said read/write stations, each said picker having at least one gripper for fetching and delivering media at said media storage slots and said read/write stations, said library receiving input commands for jobs to move media amongst said media storage slots and said read/write stations, including input commands resulting in the requirement for an exchange of media at point of exchange locations in said library, said point of exchange locations including ones of said read/write stations or ones of said media storage slots, said method comprising the steps of:

in response to said received said input commands requiring an exchange, determining whether the source location for the medium to be delivered to the point of exchange, and the destination location for the medium to be fetched from said point of exchange, are on opposite sides of said point of exchange thereof;

if said determining step determines that the source and destination locations for said media to be exchanged are on opposite sides of said point of exchange thereof, decomposing said exchange into separate moves; and assigning said separate moves to different ones of said pickers.

2. The method of claim 1, wherein said determining step additionally comprises determining whether each of two of said pickers has at least one available gripper.

3. The method of claim 2, wherein said assigning step additionally comprises ordering the sequence of said separate moves so that the fetch of a medium from said point of exchange precedes the delivery of a medium to said point of exchange.

4. The method of claim 2, wherein said step of assigning said moves additionally comprises selecting the one of said pickers having an available gripper which is closest to said destination location to fetch said medium from said point of exchange.

5. The method of claim 1, wherein each of said pickers additionally has at least two grippers, and wherein if said determining step determines that the source and destination locations for said media to be exchanged are on the same side of said point of exchange thereof, maintaining said exchange as combined moves without decomposition, and wherein said assignment step additionally comprises assigning said combined exchange moves to only one of said pickers.

6. An automated data storage library, comprising:

a plurality of media storage slots for storing data storage media;

a plurality of read/write stations, at least one of said read/write stations positioned between at least ones of said plurality of media storage slots;

at least two pickers arranged on a common guideway alongside said media storage slots and said read/write stations, each said picker having at least one gripper for fetching and delivering media at said media storage slots and said read/write stations;

an input for receiving input commands for jobs to move media amongst said media storage slots and said read/write stations, including input commands resulting in the requirement for the exchange of media at point of exchange locations in said library, said point of exchange locations including ones of said read/write stations or ones of said media storage slots; and a controller for responding to said received input commands, determining whether, in an exchange, the source location for the medium to be delivered to the point of exchange, and the destination location for the medium to be fetched from said point of exchange, are on opposite sides of said point of exchange thereof; and if said determination is that the source and destination locations for said media to be exchanged are on opposite sides of said point of exchange thereof, decomposing said exchange into separate moves; and assigning said separate moves to different ones of said pickers.

7. The automated data storage library of claim 6, wherein said controller additionally determines whether each of two of said pickers has at least one available gripper, and only if said gripper determination is that each of two of said pickers has at least one available gripper, said controller decomposes said exchange.

8. The automated data storage library of claim 7, wherein said controller additionally orders the sequence of said assigned separate moves so that the fetch of a medium from said point of exchange precedes the delivery of a medium to said point of exchange.

9. The automated data storage library of claim 7, wherein said controller additionally assigns the one of said moves for fetching said medium from said point of exchange to the one of said pickers having an available gripper which is closest to said destination location.

10. The automated data storage library of claim 6, wherein if said controller determination is that the source and destination locations for said media to be exchanged are on the same side of said point of exchange thereof, said controller additionally maintains said exchange as combined moves without decomposition, and wherein said controller additionally assigns said combined exchange moves to only one of said pickers.

11. A computer program product usable with a programmable computer processor having computer readable program code embodied therein for operating said programmable computer processor for operating an automated data storage library, said library having a plurality of media storage slots for storing data storage media, a plurality of read/write stations, at least one of said read/write stations positioned between at least ones of said plurality of media storage slots, at least two pickers arranged on a common guideway alongside said media storage slots and said read/write stations, each said picker having at least one gripper for fetching and delivering media at said media storage slots and said read/write stations, said library receiving input commands for jobs to move media amongst said media storage slots and said read/write stations, including input commands resulting in the requirement for an exchange of media at point of exchange locations in said library, said point of exchange locations including ones of said read/write stations or ones of said media storage slots, comprising:

computer readable program code which causes a computer processor to respond to said received said input commands requiring an exchange, by determining whether the source location for the medium to be delivered to the point of exchange, and the destination location for the medium to be fetched from said point of exchange, are on opposite sides of the point of exchange thereof;

computer readable program code which causes a computer processor to respond to said determination determining that the source and destination locations for said media to be exchanged are on opposite sides of said point of exchange thereof, by decomposing said exchange into separate moves; and computer readable program code which causes a computer processor to assign each of said separate moves to a different one of said pickers.

12. The computer program product of claim 11, wherein said computer readable program code which causes a computer processor to make said determination, additionally causes said computer processor to determine whether each of two of said pickers has at least one available gripper, and only upon said additional determination indicating that each of two of said pickers has at least one available gripper, then causes said computer processor to decompose said exchange.

13. The computer program product of claim 12, wherein said computer readable program code which causes a computer processor to assign said separate moves additionally causes said computer processor to order the sequence of said separate moves so that the fetch of a medium from said point of exchange precedes the delivery of a medium to said point of exchange.

14. The computer program product of claim 12, wherein said computer readable program code which causes a computer processor to assign said separate moves additionally causes said computer processor to select the one of said pickers having an available gripper which is closest to said destination location to fetch said medium from said point of exchange.

15. The computer program product of claim 12, wherein said computer readable program code which causes a computer processor to determine whether the source and destination locations for said media to be exchanged are on opposite sides of said point of exchange thereof, additionally causes said computer processor to, upon said determination is that the source and destination locations for said media to be exchanged are on the same side of said point of exchange thereof, maintaining said exchange as combined moves without decomposition, and additionally causes said computer processor to assign said exchange moves to only one of said pickers.

16. An article of manufacture comprising a computer readable medium having computer readable program code embodied therein for operating a programmable computer processor for operating an automated data storage library, said library having a plurality of media storage slots for storing data storage media, a plurality of read/write stations, at least one of said read/write stations positioned between at least ones of said plurality of media storage slots, at least two pickers arranged on a common guideway alongside said media storage slots and said read/write stations, each said picker having at least one gripper for fetching and delivering media at said media storage slots and said read/write stations, said library receiving input commands for jobs to move media amongst said media storage slots and said read/write stations, including input commands resulting in the requirement for an exchange of media at point of exchange locations in said library, said point of exchange locations including ones of said read/write stations or ones of said media storage slots, comprising:

computer readable program code which causes a computer processor to respond to said received said input commands requiring an exchange, by determining whether the source location for the medium to be delivered to the point of exchange, and the destination location for the medium to be fetched from said point of exchange, are on opposite sides of the point of exchange thereof;

computer readable program code which causes a computer processor to respond to said determination determining that the source and destination locations for said media to be exchanged are on opposite sides of said point of exchange thereof, by decomposing said exchange into separate moves; and computer readable program code which causes a computer processor to assign each of said separate moves to a different one of said pickers.

17. The article of manufacture of claim 16, wherein said computer readable program code which causes a computer processor to make said determination, additionally causes said computer processor to determine whether each of two of said pickers has at least one available gripper, and only upon said additional determination indicating that each of two of said pickers has at least one available gripper, then causes said computer processor to decompose said exchange.

18. The article of manufacture of claim 17, wherein said computer readable program code which causes a computer processor to assign said separate moves additionally causes said computer processor to order the sequence of said separate moves so that the fetch of a medium from said point of exchange precedes the delivery of a medium to said point of exchange.

19. The article of manufacture of claim 17, wherein said computer readable program code which causes a computer processor to assign said separate moves additionally causes said computer processor to select the one of said pickers having an available gripper which is closest to said destination location to fetch said medium from said point of exchange.

20. The article of manufacture of claim 16, wherein said computer readable program code which causes a computer processor to determine whether the source and destination locations for said media to be exchanged are on opposite sides of said point of exchange thereof, additionally causes said computer processor to, upon said determination is that the source and destination locations for said media to be exchanged are on the same side of said point of exchange thereof, maintaining said exchange as combined moves without decomposition, and additionally causes said computer processor to assign said combined exchange moves to only one of said pickers.

\* \* \* \* \*